United States Patent Office 3,259,655
Patented July 5, 1966

3,259,655
PHOSPHORUS CONTAINING LOWER MONO-OLEFIN POLYMERS AND THEIR PRODUCTION VIA REACTION OF THE POLYMER WITH PHOSPHORUS TRICHLORIDE
William M. Le Suer, Cleveland, Ohio, assignor to the Lubrizol Corporation, Wickliffe, Ohio, a corporation of Ohio
No Drawing. Filed July 29, 1963, Ser. No. 298,419
17 Claims. (Cl. 260—543)

This application is a continuation-in-part of copending application Serial No. 809,623, filed April 29, 1959, now abandoned.

This invention relates to a novel method for the incorporation of phosphorus into organic compounds, and in a more particular sense to such a process by which liquid, oil-soluble phosphorus-containing organic compounds are made available for the further preparation of acidic compounds.

It has long been known that the presence of phosphorus in certain oil-soluble organic compounds appears to impart to such compounds certain properties which make them useful as additives in lubricant compositions. Such use may be based upon its ability to provide protection from the ravages of extreme pressure, as in a gear lubricant, or it may act to inhibit corrosion, oxidation, rust, etc. For this reason organic phosphorus compounds have achieved a unique status in the field of lubrication chemistry. They are also used in fuel oils such as hydrocarbon fuel oils and gasolines to inhibit deterioration of the oil or to disperse the deterioration products so as to prevent the formation of harmful deposits.

Typical examples of such useful phosphorus-containing organic compounds include the products prepared by the reaction of relatively high molecular weight hydrocarbons (M.W. 300–2000) with a phosphorus sulfide. Sulfur may also be included in the reaction mixture, and the resulting product, when subjected to hydrolysis and neutralization with a basic metal compound such as lime, produces a valuable detergent for use in lubricating oils. Such a product acts also to inhibit corrosion. Valuable lubricant additives can also be obtained from the reaction of olefins with phosphorus chlorides in the presence of aluminum chloride.

Still further, the reaction of alcohols with phosphorus pentasulfide produces phosphorodithioic acids and the zinc and barium salts of these are especially well known inhibitors of corrosion and oxidation in a lubricating oil. Still another example of the utility of organic phosphorus compounds has been observed with respect to the reaction product of alcohols and phosphorus trichloride. Such products have been used for many years in gear lubricants in which they are effective in the protection of the gear surfaces from extreme pressure. The reaction of terpenes with phosphous pentasulfide also provides useful corrosion inhibitors. These latter products are useful as such, and also they may be neutralized with zinc oxide or barium oxide to yield other useful compositions.

It is therefore, a principal object of this invention to provide novel oil-soluble, phosphorus-containing compositions.

It is a further object of this invention to provide novel compositions which are useful in lubricants.

It is still a further object of this invention to provide a novel process by which such phosphorus-containing organic compositions can be prepared.

It is another object of this invention to provide novel compositions useful as additives in fuels.

It is another object of this invention to provide improved fuel compositions.

It is another object of this invention to provide improved lubricant compositions.

These and other objects are accomplished by the process for the preparation of liquid, oil-soluble phosphorus-containing compositions which comprises heating at a temperature above about 130° F., a mixture of a chlorinated hydrocarbon polymer of a lower mono-olefin containing from about 0.1% to about 20% by weight of chlorine, and from about 0.25 to 2.0 moles of phosphorus trichloride per atom of chlorine in said polymer, and then contacting the mass with a compound having the formula RXH wherein R is selected from the class consisting of hydrogen and a hydrocarbon radical and X is selected from the class consisting of oxygen and sulfur to remove a substantial portion of the water-soluble chlorine.

The reactivity of the chlorinated olefin polymer with phosphorus trichloride has not heretofore been realized, particularly in view of the known unreactivity of polyolefins in general with phosphorus halides, and particularly with phosphorus trichloride. Thus, it is a matter of common knowledge that polyisobutene will not react with phosphorus trichloride under ordinary conditions. The reaction can be made to proceed under certain conditions, ordinarily involving the use of a metal halide catalyst such as aluminum chloride or the presence of an oxidizing agent. But a mixture of these two reactants alone cannot be made to produce a phosphorus-containing product. It was unexpected, therefore, to note a definite chemical reaction between a chlorinated polyisobutylene, for example, and phosphorus trichloride merely upon heating a mixture of these two reactants. It is apparent from these observations that the presence of chlorine in a polyolefin molecule serves to activate that molecule with respect to its susceptibility to reaction with phosphorus trichloride. The nature of this "activation" is not known.

The relative amounts of reactants used in the first step of the process of this invention are related to the reactivity of the chlorine in the polymer chain with the phosphorus trichloride. The amount of phosphorus trichloride used should be within the range of from about 0.25 to about 2.0 moles per atom of chlorine in the chlorinated olefin polymer. It is preferred to use an amount of phosphorus trichloride near the upper range of this ratio, although the reason for this is based solely upon economy. A principal purpose of the process is the incorporation of phosphorus into the product, and the chlorine in the polymer chain serves merely to aid in this incorporation of phosphorus. Thus the chlorinated polyolefin ordinarily will contain a minimum amount of chlorine (for reasons of economy) with respect to this function, viz., the incorporation of phosphorus into the product. The apparent maximum effectiveness of the chlorine in serving such purpose is reflected by this upper limit of the ratio of phosphorus trichloride to chlorine, i.e., 2:1. The use of a larger amount of phosphorus trichloride than indicated by this ratio results in a product having no more phosphorus than that obtained by the use of two moles of phosphorus trichloride per atom of chlorine in the polymer chain. Similarly the use of less phosphorus chloride than indicated by this ratio of 2:1, while in no way detrimental to the reaction of the process, indicates the presence in the polymer molecule of more chlorine than is needed to aid in the incorporation of a maximum quantity of phosphorus.

Polyolefins of virtually all molecular weights are usable in the process. That is to say the presence of chlorine in any polyolefin serves to activate the polyolefin with respect to its reactivity with phosphorus trichloride. As a practical matter, however, it has been noted that these polyolefins having molecular weights within the broad range of from about 350 to about 50,000 are most useful. Polyolefins having molecular weight lower than 350 do not seem to be benefitted nearly so much by the presence of chlorine in their molecular structure (for the purpose of this invention) as do the higher molecular weight polymers. At the other end of the range of molecular weight, it has been noted that chlorinated polyolefins having a moleclar weight greater than 50,000, while reactive to produce useful products, are less reactive than the lower molecular weight chlorinated polyolefins and correspondingly less satisfactory for the purposes of this invention.

The olefin polymer from which the chlorinated hydrocarbon polymers of the above-noted process are derived include principally the substantially aliphatic polymers of lower mono-olefins such as ethylene, propene, isobutene, and 1-butene. The polymers also include interpolymers of these lower mono-olefins with a minor amount of aromatic olefins, diolefins, and cyclic olefins provided that at least about 95% by weight of the interpolymers is comprised of the lower mono-olefin units so that the substantially aliphatic character of the polymer is not altered. Examples of polymers include polyisobutene, polypropenes, polyethylenes, copolymer of 96% of isobutene and 4% of styrene, copolymer of 98% of isobutene and 2% of chloroprene, copolymer of 98% isobutene, 1% of butadiene, and 1% of n-hexene. Polymers of isobutene are most frequently used because of ready availability.

The method by which the substantially aliphatic olefin polymers may be chlorinated is not critical. A convenient method comprises passing a stream of chlorine into the olefin polymer at a temperature of 50°–100° C. till the desired amount of chlorine has been incorporated into the polymer molecules. An inert solvent such as carbon tetrachloride, ethylene dichloride, mineral oil, or n-hexene may be used in the chlorination reaction.

The reaction conditions of the first step of the process involve merely mixing the reactants and heating the mixture, usually with agitation, at a temperature in excess of about 130° C. It will be noted that this minimum reaction temperature exceeds that of the boiling point of phosphorus trichloride. For this reason it is necessary to mix the reactants by adding the phosphorus trichloride portionwise to the chlorinated polyolefin, and to provide means for the return of unreacted, volatilized phosphorus trichloride to the reaction mixture. As a practical matter, it is preferred to add the phosphorus trichloride through a tube extending beneath the surface of the liquid reaction mixture, thus insuring intimate contact and maximum reaction of the two reactants. Ordinarily the temperature of the reaction mixture is within the range of 150°–225° C. As indicated earlier the process may be carried out at temperatures as low as about 130° C.; somewhat higher temperatures may be employed, within the limits of the thermal stability of the reactants and product. There seems to be no advantage in carrying the reaction out at temperatures higher than about 250° C., and in this light a practical operating range of temperature for this step of the process may be considered as extending from about 130° C. to about 250° C.

The intermediate product available from the above-described step contains phosphorus and chlorine; much of the chlorine is loosely bonded to the polymeric chain and is quite susceptible to hydrolysis. For the purposes of this invention a substantial proportion of such loosely bonded chlorine is removed in the second step of the process. This removal of chlorine is effected by heating with a compound having the formula RXH wherein R is selected from the class consisting of hydrogen and a substantially hydrocarbon radical and X is selected from the class consisting of oxygen and sulfur. Examples of such compounds include water, hydrogen sulfide, alcohols, phenolic compounds and mercaptans.

Specific examples of alcohols which are useful in this step include methanol, ethanol, n-propanol, n-butanol, n-amyl alcohol, tert-amyl alcohol, and n-hexanol. Among the phenolic compounds which have been found useful are phenol, resorcinol, thiophenol and their substitution products such as, for example, heptylphenol, para-ethyl phenol, heptyl thiophenol, para-ethyl thiophenol, and 4-ethyl resorcinol. Specific examples of mercaptans which are useful in the process of this invention include n-hexyl mercaptan, n-heptyl mercaptan, decyl mercaptan and dodecyl mercaptan.

Preferably this step is effected by means of steam at temperatures of the order of 100°–160° C. The intermediate product is heated to 150° C., for example, whereupon steam is blown through the mass. The treatment with steam is continued until all of the unstably bonded chlorine is removed, and in most cases, one hour of such treatment is sufficient to accomplish this result. The removal of chlorine may alternatively be carried out by adding water, alcohol, a phenolic compound, or a mercaptan to the intermediate product and then heating the mixture to 80°–200° C. to effect the hydrolysis. The product which results from this step contains an appreciable amount of chlorine ranging from 0.1% upward. It will be seen that the upper limit of such chlorine content is determined largely by the chlorine content of the chlorinated polymer used as a starting material.

The determination of water-soluble chlorine is made by adding to 3 grams of a sample, about 20 ml. of a solvent mixture comprising 100 parts of benzene, 99 parts of isopropyl alcohol and 1 part of water (D974–58T, page 452 of the 1958 ASTM Manual). This mixture of sample and solvent is agitated to insure complete mixing and then extracted with water. The water layer is acidified with nitric acid and titrated with aqueous silver nitrate.

The process of the invention may be illustrated in further detail by the following examples. For the purpose of these examples, the equivalent weight of the chlorinated polymer is that weight containing one atomic weight of chlorine.

EXAMPLE 1

A polyisobutene having a molecular weight of 325 is chlorinated to a chlorine content of 14.0%. To 700 grams (3.2 equivalents) of this chlorinated polyisobutene at 160°–190° C. there is added 110 grams (0.8 mole) of phosphorus trichloride. The phosphorus trichloride is added portionwise throughout a period of 1.5 hours, and is added through a tube extending beneath the surface of the stirred reaction mixture. The resulting mixture then is heated for an additional 10 hours at 180°–210° C. and then maintained at 180° C./35 mm. for 0.5 hour. The residue is diluted with 350 grams of mineral oil and this diluted product treated with steam at 150°–160° C. for 1 hour. The hydrolyzed product is dried by heating at 160° C./35 mm. and filtered. The filtrate is found to have the following analyses: percent phosphorus, 1.2; percent chlorine, 1.6; acid number, 10.

EXAMPLE 2

A polyethylene having a molecular weight of 600 is chlorinated to a chlorine content of 11.0%. To 700 grams (2.0 equivalents) of this chlorinated polyethylene there is added at 170°–200° C. 150 grams (1.1 moles) of phosphorus trichloride. The phosphorus trichloride is added portionwise through a tube extending beneath the surface of the reaction mixture. The mixture is heated for an additional period of 1.5 hours at 200°–215° C., and then at 160° C./30 mm. The residue is diluted with 290 grams of mineral oil and then hydrolyzed by passing steam through the mixture at 150° C. for 1 hour. The hydrolysate is dried and filtered to yield 900 grams of a product having the following analyses: percent phosphorus, 2; percent chlorine, 2.9; acid number, 37.

EXAMPLE 3

A chlorinated polyisobutene having 1.8% chlorine is prepared from a polyisobutene having a molecular weight of 750. A 900 gram (0.46 equivalent) sample of this chlorinated polyisobutene is treated with 138 grams (1.0 mole) of phosphorus trichloride at 150°–160° C. for 13 hours. The mixture is heated at 160° C./30 mm., diluted with 450 grams of mineral oil and treated with steam at 150° C. for 2 hours. The dried hydrolysate has the following analyses: percent phosphorus, 0.5; percent chlorine, 0.6; and acid number, 11.

EXAMPLE 4

Chlorination of a polyisobutene having a molecular weight of 1200 yields a product containing 3% of chlorine. To 690 grams (0.55 equivalent) of this chlorinated polymer there is added 123 grams (0.9 mole) of phosphorus trichloride at 170°–210° C. and the mixture is heated at this temperature for 26 hours. The product is diluted, hydrolyzed with steam at 160° C., dried and filtered. The filtrate has the following analyses: percent phosphorus, 1.4; percent chlorine, 0.2; and acid number, 37.

EXAMPLE 5

A copolymer of equal parts of isobutene and n-butene having a molecular weight of 1700 is chlorinated to a chlorine content of 4.4%. One mole (138 grams) of phosphorus trichloride is added portionwise to 790 grams (1 equivalent) of this chlorinated copolymer. The temperature of the reaction mixture is maintained at 130°–185° C. and the phosphorus trichloride is added portionwise beneath the surface of the reaction mixture throughout the period of 4.5 hours. The resulting mixture then is heated for an additional 2.5 hours at 180°–200° C. and then at 180° C./30 mm. for 30 minutes. The residue is diluted with 390 grams of mineral oil, treated with steam at 150°–160° C. for 1 hour, dried and then filtered. The filtrate, weighing 1050 grams, shows the following analyses: percent phosphorus, 1.4; percent chlorine, 0.5; and acid number, 22.

EXAMPLE 6

A 50–50 (by weight) mixture of a high molecular weight (20,000) polyisobutene and a low molecular weight (750) polyisobutene is chlorinated to a chlorine content to 3.7%. To 780 grams of this product there is added dropwise 138 grams of phosphorus trichloride at 160°–180° C. When all of the phosphorus trichloride has been added, the mixture is heated further for 10 hours at 170°–200° C. The product mixture is diluted with 390 grams of mineral oil heated again to 150° C./30 mm., and the residue treated with steam at 170–180° C. for 2 hours. This product is dried and filtered to yield a filtrate with the following analyses: percent phosphorus, 1.0; percent chlorine, 0.65; and acid number, 20.

EXAMPLE 7

A polypropene having a molecular weight of 800 is chlorinated to a chlorine content of 5.1%. To 760 grams (1 equivalent) of this chlorinated polypropene there is added at 165°–190° C. during a period of 3 hours, 133 grams of phosphorus trichloride. The resulting product mixture is heated for an additional 10.5 hours at 170°–210° C. and then diluted with 380 grams of mineral oil. This diluted product is hydrolyzed with steam for 1 hour at 150°–160° C., then dried and filtered. The filtrate shows the following analyses: percent phosphorus, 1.3; percent chlorine, 0.35; and acid number, 16.

EXAMPLE 8

A copolymer of equimolar amounts of isobutene and propene, having a molecular weight of 870, is chlorinated to a chlorine content of 6.5%. To 800 grams of this chlorinated copolymer there is added portionwise over a period of 5.2 hours, 138 grams of phosphorus trichloride. The temperature of the mixture is maintained at 158°–195° C. during this addition, and then raised to 195°–200° C. for 9 hours thereafter. The product mixture is then freed of volatile constituents by heating to 170° C./20 mm. The residue is diluted with 65 grams of mineral oil and then hydrolyzed with steam for 1 hour at 145°–150° C. After drying, the hydrolysate is filtered to yield a product having the following analyses: percent phosphorus, 1.5; percent chlorine, 0.5; and acid number, 31.

EXAMPLE 9

To 761 grams of chlorinated polypropene (prepared from polypropene having a molecular weight of 860) having a chlorine content of 5.1% there is added at 165°–186° C., 133 grams of phosphorus trichloride. The phosphorus trichloride is added portionwise over a period of 2.7 hours and when all has been added, the resulting mixture is heated at 168°–210° C. for 10.5 hours. The product mixture is then heated to 170° C./20 mm. and diluted with 70 grams of mineral oil. Steam is then blown through the mixture for 1 hour at 151°–165° C. and the resulting hydrolysate dried and filtered. The filtrate shows the following analyses: percent phosphorus, 1.3; percent chlorine, 0.35; and acid number, 16.

EXAMPLE 10

Polyisobutene having a molecular weight of 49,000 is chlorinated to a chlorine content of 2%. To a 40% solution of the chlorinated polyisobutene in mineral oil, there is added at 188°–198° C., 76 grams of phosphorus trichloride over a period of 5.7 hours. The temperature is maintained at 188°–225° C. for an additional 12 hours. To 168 grams of this product there is added dropwise at 150° C., 47 ml. of water. When all of the water has been added, the mixture is heated for an additional hour at 150° C. The residue is found to contain the following analyses: percent phosphorus, 0.47; percent water-soluble chlorine, 0.0; and acid number, 7.4.

EXAMPLE 11

Chlorination of a polyisobutene having a molecular weight of 750 yields a product containing 0.61% of chlorine. To 200 grams of this chlorinated polyisobutene at 200°–237° C. there is added 4.7 grams (0.034 mole) of phosphorus trichloride over a period of 5.5 hours. The product is heated to 190° C./25 mm. for 1.5 hours. To 100 grams of this product there is added dropwise at 150° C., 56 ml. of water. After all of the water has been added, the temperature is maintained at 150° C. for an additional hour. The residue is found to contain the following analyses: percent phosphorus, 0.33; percent water-soluble chlorine, 0.1; and acid number, 6.0.

EXAMPLE 12

Polyisobutene having a molecular weight of 1,000 is chlorinated to a chlorine content of 4.3%. To 900 parts of this chlorinated polyisobutene at 110°–188° C. there is added portionwise over a period of 15 hours, 150 parts of phosphorus trichloride. After an additional 2 hours of heating at 195° C., the mixture is freed of volatile components by heating at reduced pressure for an additional 1.5 hours and then blowing with nitrogen for 2 hours. This product is found to have the following analyses: percent phosphorus, 2.0; percent chlorine, 1.9; and the water-soluble chlorine is found to be 1.4%. To 300 grams of this product there is added 30 grams of methanol and the mixture heated at a temperature increasing from 66° C. (reflux) up to 200° C. over a period of 5.5 hours. The residue shows a water-soluble chlorine content of "nil."

EXAMPLE 13

A chlorinated polyisobutene-phosphorus trichloride reaction product is prepared as in Example 12 and then treated with hydrogen sulfide at 100°–147° C. for 1.5 hours. The product is filtered through a siliceous filter aid to yield a clear filtrate having the following analyses: percent phosphorus, 1.7; percent chlorine, 0.4; and acid number, 16.

EXAMPLE 14

To 300 grams of the chlorinated polyisobutene-phosphorus trichloride reaction product of Example 12 there is added 20 grams of tert-amyl alcohol and the mixture is heated at reflux temperature for 2 hours. The amyl alcohol is then distilled from the mixture and the residue heated to 160° C. over a period of 14 hours. The temperature is then raised to 200° C. and held there for another 5 hours. Analysis of this product shows the following: percent phosphorus, 1.8; percent water-soluble chlorine, 0.04; and acid number, 23.

EXAMPLE 15

A mixture of 297 grams of the chlorinated polyisobutene-phosphorus trichloride reaction product of Example 12 and 35 grams of dodecyl mercaptan is heated to 190° C., over a period of 4 hours and held at this level for an additional 10 hours. The product is then heated to 215° C./20 mm. and the residue found to have the following analyses: percent phosphorus, 1.7; percent water-soluble chlorine 0.06; and acid number, 8.

EXAMPLE 16

A mixture of 305 grams of the chlorinated polyisobutene-phosphorus trichloride reaction product of Example 12 and 18 grams of thiophenol is heated to 200° C. over a period of 1.5 hours. The temperature is held at this level for another 10 hours and the product heated at 175° C. (20 mm.). The residue shows the following analyses: percent phosphorus, 1.9; percent water-soluble chlorine, 0.57; and acid number, 12.

EXAMPLE 17

A polyisobutene having a molecular weight of 750 is chlorinated to a chlorine content of 4%. Nineteen hundred and fifty grams (2.5 equivalents) of this chlorinated polymer is reacted with 344 grams (2.5 moles) of phosphorus trichloride at 180–200° C. for 10 hours. The resulting product mixture is freed of volatile constituents by heating to 140° C./30 mm. The residue is diluted with 975 grams of mineral oil, hydrolyzed with steam at 130°–160° C. for 1 hour, and dried. The residue is filtered and the filtrate is the product having the following analyses: percent phosphorus, 1.43; percent chlorine, 0.22; and acid number, 17.

EXAMPLE 18

To 1560 grams (2 equivalents) of the chlorinated polyisobutene prepared in Example 17 at 110° C. there is added 275 grams (2 moles) of phosphorus trichloride while maintaining a nitrogen atmosphere. The addition requires 6.5 hours and during this time the temperature of the reaction mixture is raised to 185° C. The reaction mixture is then heated for 2 hours at 185°–200° C. (nitrogen atmosphere maintained). The volatile constituents are then removed by heating at 160°–190°C./30 mm. for 1 hour. The residue is diluted with 780 grams of mineral oil, hydrolyzed with steam at 140°–150° C. for 1 hour and dried. The residue is filtered and the filtrate is the product having the following analyses: percent phosphorus, 1.35; percent chlorine, 0.23; acid number, 14.

EXAMPLE 19

The procedure of Example 16 is repeated except that the thiophenol is replaced, on a molar basis, by phenol.

EXAMPLE 20

Polyisobutene having a molecular weight of 1000 is chlorinated to a chlorine content of 4.6%. To 2000 parts of this chlorinated polyisobutene at 130°–190° C. there is added portionwise over a period of 15 hours, 340 parts of phosphorus trichloride. After an additional 2 hours of heating at 195° C., the mixture is freed of volatile components by heating at reduced pressure for an additional 1.5 hours. The residue is the product and is found to have the following analyses: percent phosphorus, 1.80; percent chlorine, 2.35.

A mixture of 300 parts of this chlorinated polyisobutene-phosphorus trichloride reaction product and 20 parts of t-amyl alcohol is heated at reflux (90°–110° C.) for 2 hours. The volatile components are removed by heating to 160° C. in 1.5 hours and the residue is maintained at 160°–165° C. for 5 hours, and at 200–210° C. for 5 hours. The residue is the desired product and is found to have the following analyses: percent phosphorus, 1.83; percent water-soluble chlorine, 0.08; acid number, 14.

EXAMPLE 21

A chlorinated polyisobutene-phosphorus trichloride reaction product is prepared as in Example 20 and then treated with steam for 1.5 hours at 150°–160° C. The residue is then dried by heating to 170° C./25 mm. whereupon a filter aid is added and the mixture filtered. The filtrate is the desired product and is found to have the following analyses: percent phosphorus, 1.82; percent water-soluble chlorine, 0.11; acid number, 6.

The utility of the process of this invention resides in the preparation of valuable lubricant additives from the product of the process. A specific illustration of such utility is as follows.

EXAMPLE 22

A chlorinated polyisobutylene-phosphorus trichloride reaction product was prepared as in Example 12 and then treated with steam at 160°–165° C. for 4 hours at which point successive samples showed no change in neutralization number.

To a mixture of 495 parts of mineral oil, 100 parts (0.5 equivalent) of heptyl phenol, 38 parts of water and 62 parts (0.8 equivalent) of barium oxide at 180°–200° F. there was added over a period of 3 hours, 400 parts (0.2 equivalent) of the above acid. An additional 257 parts (3.3 equivalents) of barium oxide was added to the mixture whereupon carbon dioxide was bubbled through for 3 hours at 270°–280° F. The mixture was diluted with 281 parts of mineral oil and then filtered through a siliceous filter aid. The filtrate had a barium content of 25.0% as sulfate ash.

The efficacy of a lubricant composition containing the product of Example 22 was shown by the results of engine tests carried out in accordance with U.S. Army Ordnance tentative specification AXS–1551. This test is known as the Caterpillar CRC–L–1 engine test and the particular test to which the lubricants of this invention were subjected is a modification of that test, the modification consisting of the use of a fuel having a sulfur content of 1% (significantly higher than that of the specified fuel). An SAE 30 Mid-Continent lubricating oil containing 0.057 (as sulfate ash) of the product of Example 20 showed a ring filling rating of 12% (0% being perfect) and a piston cleanliness rating of 93.5 (on a scale of 0–100) after 480-hour test period. The effectiveness of the product of Example 20 in a lubricant is enhanced by the addition to the lubricant of an alkenyl succinic anhydride-ethylene amine reaction product. Thus a lubricant containing 1.7% of such a reaction product and 0.2% (as sulfate ash) of the product of Example 20 showed in this same test a ring filling rating of only 2% and a piston cleanliness rating of 93.0 after a 480-hour test period.

In each of the lubricants tested above there was present also 0.075% (as phosphorus) of a zinc dialkyl phosphorodithioate and three parts per million of a dimethyl silicone foam inhibitor.

The utility of the process of this invention also resides in the preparation of valuable lubricant and fuel oil additives. The products of the process of this invention are particularly useful as additives in lubricating oils and hydrocarbon fuels to improve their rust-inhibiting properties, corrosion-inhibiting properties, and sludge-resistant properties. For the improvement of lubricating oils, especially mineral lubricating oils, generally from about 0.05% to about 10% of the phosphorus-containing compositions of this invention will be employed.

The lubricating oils in which the additive of this invention are useful may be of synthetic, animal, vegetable, or mineral origin. Ordinarily, mineral lubricating oils are preferred for reasons of their availability, general excellence, and low cost. For certain applications oils belonging to one of the other three groups may be preferred. For instance, synthetic polyester oils such as didodecyl adipate and di-2-ethylhexyl sebacate are often preferred as jet engine lubricants. Normally the oils preferred will be fluid oils ranging in viscosity from about 40 Saybolt Universal seconds at 100° F. to about 200 Saybolt Universal seconds at 210° F.

To prepare the final oil composition the products of the process of this invention may be added to the oil at the appropriate concentration. Alternatively, a concentrate of the additive may be prepared by dissolving the additive in a limited amount of the oil and a concentrate may then be diluted with additional amounts of the oil to prepare a final oil composition. The lubricating compositions in which the additives of this invention are present may contain other additives such as supplemental ashless detergents, metal-containing detergents, corrosion inhibitors, rust inhibitors, oxidation inhibitors, load-carrying additives, anti-foam additives, pour point depressants, viscosity index improving agents, additives to improve the frictional characteristics, etc. The concentration of these additives in the lubricating compositions may range from about 0.001% to 20% by weight.

As mentioned previously, the products of the process of this invention are also useful in other compositions, especially hydrocarbon compositions such as gasolines, burner fuel oils, cutting oils, transformer oils, hydraulic fluids, etc. The hydrocarbon compositions for use in gasoline internal combustion engines may contain from about 0.5% to about 5% of the additive while gasolines and burner fuel oils may contain as little as 0.001% or even less. In a liquid hydrocarbon fuel such as leaded gasoline, as little as 0.0001% of the phosphorus-containing composition is effective as a detergent and dispersant. In most applications, it is seldom necessary to employ more than about 1% of the phosphorus compositions of this invention in a hydrocarbon fuel.

The effectiveness of the products obtained by the process of this invention to inhibit the tendency of fuel oil to form sludge is shown by the results of a fuel oil detergent test (Table I). In this test a mixture of 4 liters of a catalytically cracked No. 2 light fuel oil containing the additive at a concentration level of 25 lbs./1000 bbl. and 15 grams of a synthetic sludge (prepared by homogenizing a 50/40/10, by weight, mixture of distilled water/fuel oil/carbon black) is circulated for 2 hours in a fuel oil burner pump (Model J3BC-100-3, manufactured by Sundstrand Machine Tool Company, Illinois), equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive. A fuel whose rating is greater than 90% is considered to have excellent clogging properties.

*Table I*

FUEL OIL DETERGENCY TEST

| Additive | Sludge | |
|---|---|---|
| | Milligrams | Percent Reduction |
| None | 460 | |
| Product of Example 20 | 7.5 | 98.4 |
| Product of Example 21 | 121.6 | 73.6 |

The effectiveness of the products obtained by the process of this invention as dispersants in fuel oil is shown by the results of the carbon black suspension test (Table II). In this test a paste containing 20% by weight of carbon black in a white mineral oil base (minimum Saybolt color, 30+) is prepared by milling the carbon black in a ball mill for 24 hours. For this test, 3 grams of the paste and 70 ml. of additive treated kerosene are placed in a blender and mixed at a low speed for 3 minutes whereupon 0.3 ml. of distilled water is added and the mixing is continued for an additional minute. The suspension is immediately poured into a four-ounce oil sample bottle and stored in an upright position. Tests are run in duplicate.

The bottles containing the sample blend are examined daily with a flashlight. If carbon gradually settles from the upper portion of the bottle, a demarcation line becomes visible. The ratio of the height of this demarcation line to the height of the oil in the bottle is reported as "percent suspended carbon" by visual inspection. Complete suspension of the carbon (no demarcation line) is designated 100%. Complete precipitation of the carbon is designated 0%.

*Table II*

CARBON BLACK SUSPENSION TEST

| Additive at 0.2% chemical | Percent Suspended Carbon | | | |
|---|---|---|---|---|
| | After 1 Day | After 2 Days | After 5 Days | After 7 Days |
| None | 0 | | | |
| | 0 | | | |
| Product of Example 20 | 100 | 100 | 100 | 100 |
| | 100 | 100 | 100 | 100 |
| Product of Example 21 | 100 | 100 | 100 | 100 |
| | 100 | 100 | 100 | 100 |

I therefore particularly point out and distinctly claim as my invention:

1. A process for the preparation of liquid, oil-soluble phosphorus-containing compositions which comprises heating at a temperature above about 130° C., a mixture of a chlorinated hydrocarbon polymer of a lower monoolefin containing from about 0.1% to about 20% by weight of chlorine, and from about 0.25 to about 2.0 moles of phosphorus trichloride per atom of chlorine in said polymer, and then contacting the mass with a compound having the formula RXH wherein R is selected from the class consisting of hydrogen and a hydrocarbon radical and X is selected from the class consisting of oxygen and sulfur at a temperature of from about 80° C. to about 200° C. to remove a substantial portion of the water-soluble chlorine.

2. The process of claim 1 characterized further in that the chlorinated olefin polymer has a molecular weight within the range of from about 350 to about 50,000.

3. The process of claim 1 characterized further in that the chlorinated olefin polymer is derived from an olefin having from two to four carbon atoms.

4. The product obtained by the process of claim 1.

5. A process for the preparation of liquid, oil-soluble phosphorus-containing compositions which comprises heating at a temperature above about 130° C., a mixture of a chlorinated hydrocarbon polymer of a lower monoolefin having a molecular weight within the range of from about 350 to 50,000 and containing from about 0.1% to about 20% by weight of chlorine, and from about 0.25 to about 2.0 moles of phosphorus trichloride per atom of chlorine in said polymer and then contacting the mass with water at a temperature of from about 80° C. to about 200° C. to remove a substantial portion of the water-soluble chlorine.

6. The process of claim 5 characterized further in that the chlorinated olefin polymer is derived from an olefin having from two to four carbon atoms.

7. A process for the preparation of liquid, oil-soluble phosphorus-containing compositions which comprises heating at a temperature above about 130° C., a mixture of a chlorinated hydrocarbon polymer of a lower mono-olefin having a molecular weight within the range of from about 350 to about 50,000 and containing from about 0.1% to about 20% by weight of chlorine, and from about 0.25 to about 2.0 moles of phosphorus trichloride per atom of chlorine in said polymer, and then contacting the mass with a phenolic compound at a temperature of from about 80° C. to about 200° C. to remove a substantial portion of the water-soluble chlorine.

8. The process of claim 7 characterized further in that the phenolic compound is thiophenol.

9. The process of claim 7 characterized further in that the chlorinated hydrocarbon polymer is derived from an olefin having from two to four carbon atoms.

10. A process for the preparation of liquid, oil-soluble phosphorus-containing compositions which comprises heating at a temperature above about 130° C., a mixture of a chlorinated hydrocarbon polymer having a molecular weight within the range of from about 350 to about 50,000 and containing from about 0.1% to about 20% by weight of chlorine, and from about 0.25 to about 2.0 moles of phosphorus trichloride per atom of chlorine in said chlorinated olefin polymer, and then contacting the mass with hydrogen sulfide at a temperature of from about 80° C. to about 200° C. to remove a substantial portion of the water-soluble chlorine.

11. The process of claim 10 characterized further in that the chlorinated olefin polymer is derived from an olefin having from two to four carbon atoms.

12. A process for the preparation of liquid, oil-soluble phosphorus-containing compositions which comprises heating at a temperature of above about 130° C., a mixture of a chlorinated olefin polymer having a molecular weight within the range of from about 350 to about 50,000 and containing from about 0.1% to about 20% by weight of chlorine, and from about 0.25 to about 2.0 moles of phosphorus trichloride per atom of chlorine in said chlorinated olefin polymer, and then contacting the mass with a mercaptan at a temperature of from about 80° C. to about 200° C. to remove a substantial portion of the water-soluble chlorine.

13. The process of claim 12 characterized further in that the chlorinated olefin polymer is derived from an olefin having from two to four carbon atoms.

14. A process for the preparation of liquid, oil-soluble phosphorus-containing compositions which comprises heating at a temperature above about 130° C., a mixture of a chlorinated olefin polymer having a molecular weight within the range of from about 350 to about 50,000 and containing from about 0.1% to about 20% by weight of chlorine, and from about 0.25 to about 2.0 moles of phosphorus trichloride per atom of chlorine in said chlorinated olefin polymer, and then treating the resulting product with steam at about 110°–160° C., to remove a substantial portion of water-soluble chlorine.

15. A process for the preparation of liquid, oil-soluble phosphorus-containing compositions which comprises heating at a temperature above about 130° C., a mixture of a chlorinated hydrocarbon polymer of a lower mono-olefin having a molecular weight within the range of from about 350 to about 50,000 and containing from about 0.1% to about 20% by weight of chlorine and from about 0.25 to about 2.0 moles of phosphorus trichloride per atom of chlorine in said polymer, and then contacting the mass with an alcohol at a temperature of from about 80° C. to about 200° C. to remove a substantial portion of the water-soluble chlorine.

16. A process for the preparation of liquid, oil-soluble phosphorus-containing compositions which comprises heating at a temperature from about 130° C. to about 250° C., a mixture of a chlorinated hydrocarbon polymer of a lower mono-olefin having a molecular weight within the range of from about 350 to about 50,000 and containing from about 0.1% to about 20% by weight of chlorine and from about 0.25 to about 2.0 moles of phosphorus trichloride per atom of chlorine in said polymer, and then contacting the mass with methanol at a temperature of from about 80° C. to about 200° C. to remove a substantial portion of the water-soluble chlorine.

17. A process for the preparation of a liquid, oil-soluble phosphorus-containing composition which comprises heating at a temperature from about 130° C. to about 250° C., a mixture of a chlorinated olefin polymer having a molecular weight within the range of from about 350 to about 50,000 and containing from about 0.1% to about 20% by weight of chlorine and from about 0.25 to about 2.0 moles of phosphorus trichloride per atom of chlorine in said chlorinated olefin polymer and then contacting the mass with dodecyl mercaptan at a temperature of from about 80° C. to about 200° C. to remove a substantial portion of the water-soluble chlorine.

References Cited by the Examiner

UNITED STATES PATENTS

| | | | |
|---|---|---|---|
| 2,262,813 | 11/1941 | Morway et al. | 252—49.9 |
| 2,481,188 | 9/1949 | Babayan | 260—94.9 |
| 2,571,332 | 10/1951 | Brooks | 252—46.7 |
| 2,592,497 | 4/1952 | Waddey et al. | 252—46.7 |
| 2,683,169 | 7/1954 | Jensen et al. | 260—543 |
| 2,685,602 | 8/1954 | Woodstock et al. | 260—543 |

LORRAINE A. WEINBERGER, *Primary Examiner.*

DANIEL E. WYMAN, *Examiner.*

L. G. XIARHOS, B. EISEN, H. C. WEGNER,
*Assistant Examiners.*